(12) United States Patent
Aikawa

(10) Patent No.: US 12,671,344 B2
(45) Date of Patent: Jun. 30, 2026

(54) BUS BAR MODULE AND POWER CONVERSION SYSTEM

(71) Applicant: TMEIC Corporation, Tokyo (JP)

(72) Inventor: Kyota Aikawa, Tokyo (JP)

(73) Assignee: TMEIC Corporation, Tokyo (JP)

( * ) Notice: Subject to any disclaimer, the term of this patent is extended or adjusted under 35 U.S.C. 154(b) by 152 days.

(21) Appl. No.: 18/291,788

(22) PCT Filed: Jul. 29, 2021

(86) PCT No.: PCT/JP2021/028019
§ 371 (c)(1),
(2) Date: Jan. 24, 2024

(87) PCT Pub. No.: WO2023/007643
PCT Pub. Date: Feb. 2, 2023

(65) Prior Publication Data
US 2025/0096695 A1     Mar. 20, 2025

(51) Int. Cl.
*H02M 7/00* (2006.01)
*H02G 5/02* (2006.01)
*H02M 7/48* (2007.01)

(52) U.S. Cl.
CPC .............. *H02M 7/003* (2013.01); *H02G 5/02* (2013.01); *H02M 7/48* (2013.01)

(58) Field of Classification Search
CPC ........ H02M 1/00; H02M 1/007; H02M 1/008; H02M 1/14; H02M 3/003; H02M 7/003; H02M 7/48; H02M 7/537; H02M 7/5387; H02M 7/493; H02M 7/08; H02M 7/483; H02M 7/515; H02M 7/53875; H02G 5/02; H05K 5/0217; H05K 5/0065; H05K 7/14329; H02H 7/1213
See application file for complete search history.

(56) References Cited

U.S. PATENT DOCUMENTS

| | | | | |
|---|---|---|---|---|
| 2014/0160823 A1* | 6/2014 | Uetake | .................. | H01L 23/473 |
| | | | | 363/141 |
| 2018/0175572 A1* | 6/2018 | Falk | ...................... | H01R 25/162 |
| 2021/0143748 A1* | 5/2021 | Ikegami | ............. | H05K 7/14329 |

FOREIGN PATENT DOCUMENTS

| | | | | | |
|---|---|---|---|---|---|
| CN | 207459656 U | * | 6/2018 | | |
| JP | 10-506780 A | | 6/1998 | | |
| JP | 5972775 B2 | * | 8/2016 | | |
| WO | WO-2019087852 A1 | * | 5/2019 | ........... | H05K 5/0247 |

\* cited by examiner

*Primary Examiner* — Thienvu V Tran
*Assistant Examiner* — Shahzeb K Ahmad
(74) *Attorney, Agent, or Firm* — Knobbe, Martens, Olson & Bear, LLP

(57) ABSTRACT

A bus bar module is disposed over a plurality of housings to distribute DC power to smoothing capacitors and power conversion units. The bus bar module includes a first conductor and a second conductor. The first conductor is applied to either a first electrode or a second electrode of direct current. The second conductor is connected in parallel to the first conductor. The first conductor includes a first flat plate portion formed to have a first thickness in a cross section perpendicular to an extension direction. The second conductor includes a second flat plate portion having a cross section bent at a predetermined angle in a cross section perpendicular to the extension direction and formed with a second thickness thinner than the first thickness.

13 Claims, 14 Drawing Sheets

65UUa

WC WC WC WC WC WC WC (a)

65UUa

FH FH FH FH (c)

65UUa

FIG. 12

BUS BAR MODULE AND POWER CONVERSION SYSTEM

TECHNICAL FIELD

The present invention relates to a bus bar module and a power conversion system.

BACKGROUND ART

A power conversion system in which a plurality of power conversion units are divided and disposed in a plurality of housings and are connected by a common DC bus bar is known. A lower limit of a cross-sectional area S of a DC bus bar is determined by an output capacity of the power conversion system, and the like. Reducing the cross-sectional area S of the DC bus bar or increasing a length of the DC bus bar may increase a wiring inductance L and may cause resonance in the circuit. Therefore, it was not easy to reduce the total amount of conductors in the DC bus bar.

CITATION LIST

Patent Document

[Patent Document 1]
Japanese Unexamined Patent Application, First Publication
No. H10-506780

SUMMARY OF INVENTION

Technical Problem

A problem to be solved by the present invention is to provide a bus bar module and a power conversion system capable of reducing the total amount of conductors in a DC bus bar.

Solution to Problem

A bus bar module according to one aspect of an embodiment is disposed over a plurality of housings to distribute DC power to smoothing capacitors and power conversion units. The bus bar module includes a first conductor and a second conductor. The first conductor is applied to either a first electrode or a second electrode of direct current. The second conductor is connected in parallel to the first conductor. The first conductor includes a first flat plate portion formed to have a first thickness in a cross section perpendicular to an extension direction. The second conductor includes a second flat plate portion having a cross section bent at a predetermined angle in a cross section perpendicular to the extension direction and formed with a second thickness thinner than the first thickness.

BRIEF DESCRIPTION OF DRAWINGS

FIG. 1 is a schematic configuration diagram of a power conversion system according to a first embodiment.

FIG. 10 is a diagram for describing a DC bus bar according to a modified example of the first embodiment.

FIG. 12 is a diagram showing a branch circuit from a DC bus bar to a capacitor according to a second embodiment.

DESCRIPTION OF EMBODIMENTS

Figure 2:
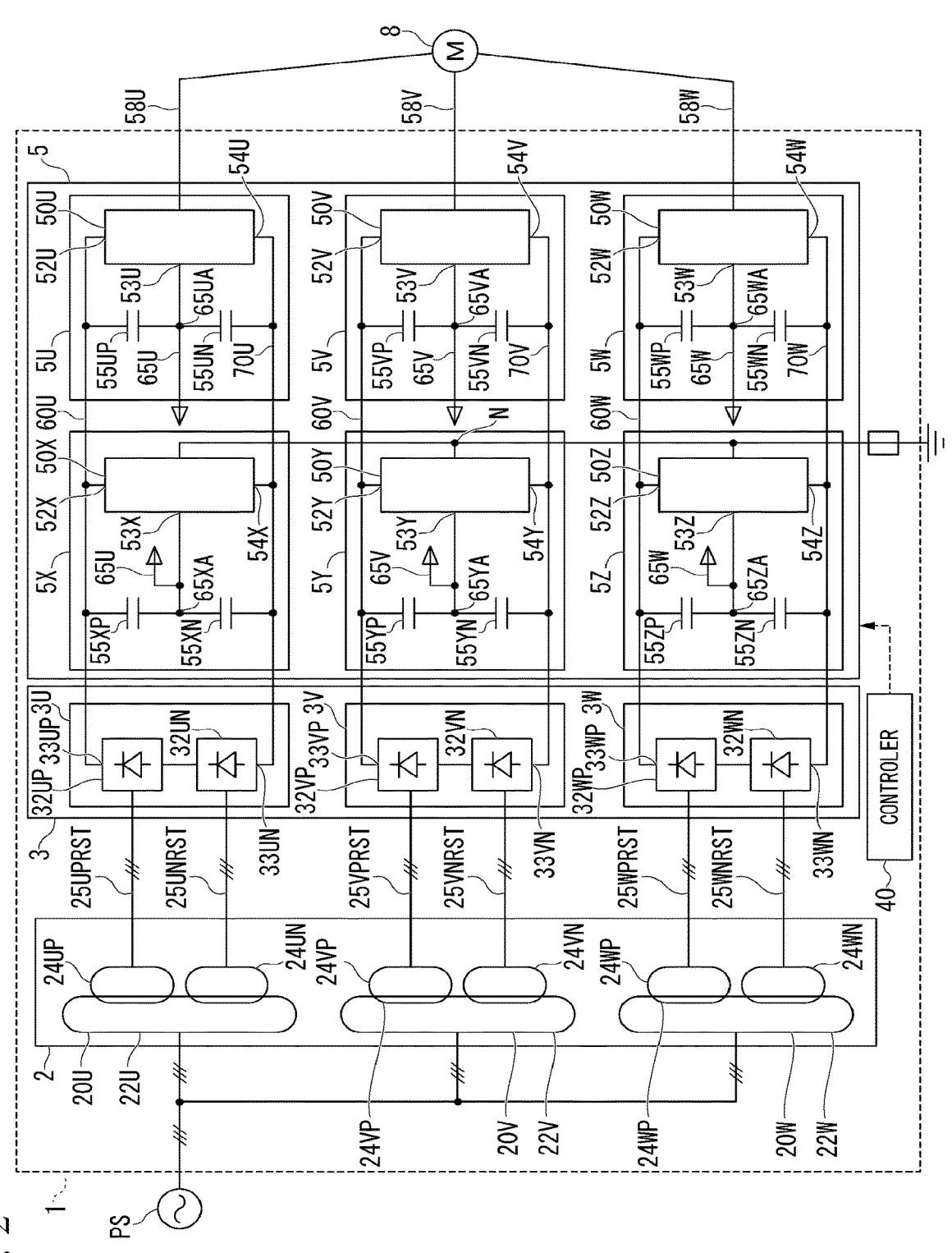
FIG. 2 is a configuration diagram of the power conversion system according to the first embodiment.

Hereinafter, a bus bar module and a power conversion system according to embodiments will be described with reference to the drawings. The drawings are schematic or conceptual, and the distribution of functions of each part is not necessarily the same as the actual one.

In the specification and drawings of the present application, the same reference numerals are given to components having the same or similar functions. Duplicate descriptions of the configurations may be omitted.

In the embodiments, the term "connection" includes electrical connection. The terms "based on XX" mean "based on at least XX" and may include "based on other elements in addition to XX." The terms "based on XX" are not limited to the case in which XX is used directly, but can also include the case based on that XX is calculated or processed. The terms "XX or YY" are not limited to either one of XX and YY, and may include both of XX and YY. This is also the case in which there are three or more selective elements. The "XX" and "YY" are arbitrary elements (for example, arbitrary information).

Also, first, a +X direction, a −X direction, a +Y direction, a −Y direction, a +Z direction, and a −Z direction are defined. The +X direction, the −X direction, the +Y direction, and the −Y direction are directions along a floor surface on which a power conversion system is placed. The +X direction is, for example, a direction along which devices related to the power conversion system are arranged. The −X direction is a direction opposite to the +X direction. When the +X direction and the −X direction are not distinguished, they are simply referred to as an "X direction." The +Y direction and −Y direction are directions that intersect (for example, substantially perpendicular to) the X direction and may be referred to as a depth direction of each device related to the power conversion system. The +Y direction and the −Y direction are opposite to each other. When the +Y direction and the −Y direction are not distinguished, they are simply referred to as a "Y direction." When each device related to the power conversion system is seen in the +Y direction, it is called the front, and when it is seen in the −Y direction, it is called the rear. The +Z direction and −Z direction are directions that intersect (for example, substantially perpendicular to) the X direction and the Y direction and are, for example, a vertical direction. The +Z direction is an upward direction. The −Z direction is a direction opposite to the +Z direction. When the +Z direction and the −Z direction are not distinguished, they are simply referred to as a "Z direction."

First Embodiment

Figure 1:
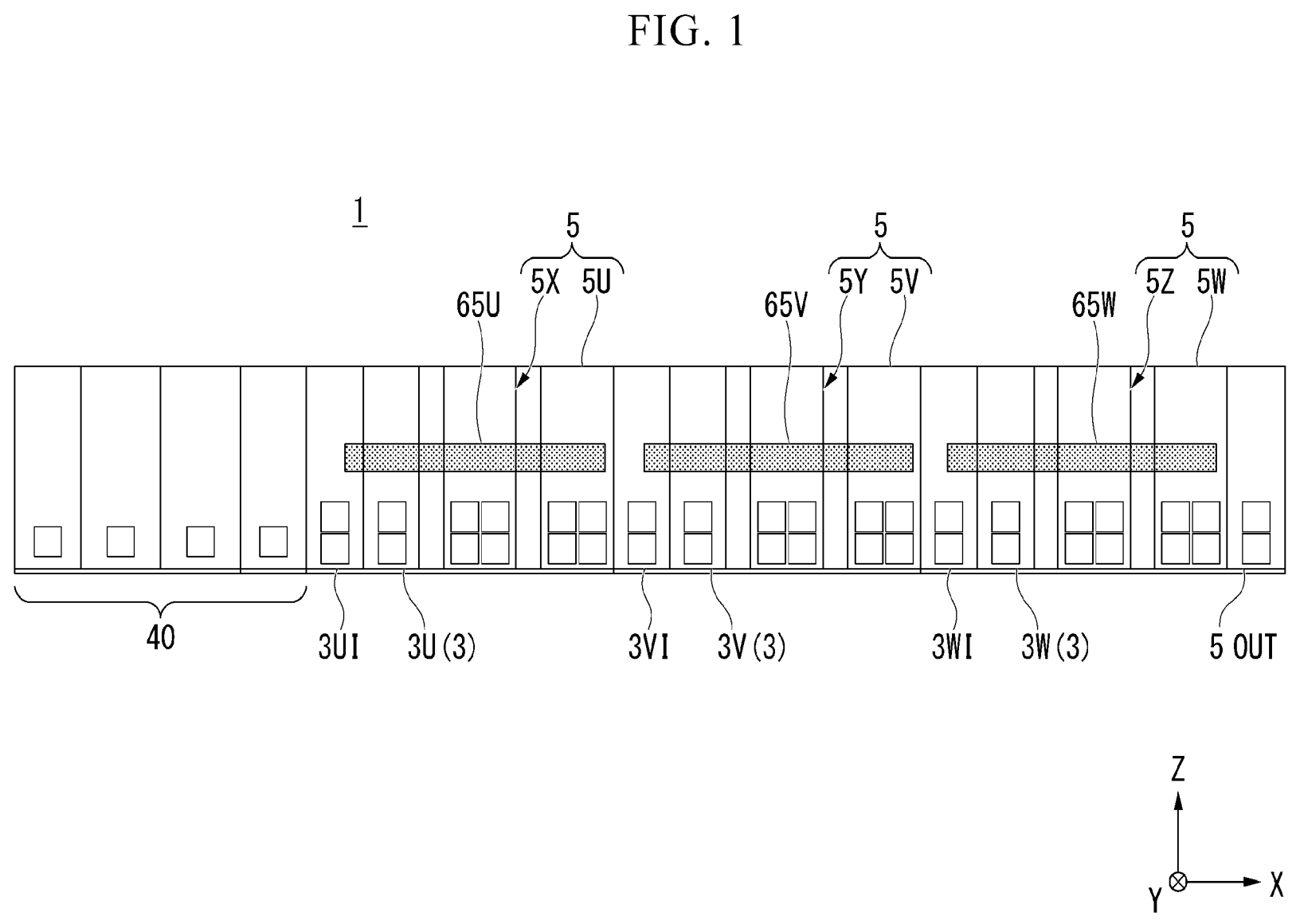

FIG. 1 is a schematic configuration diagram of a power conversion system 1 according to a first embodiment.

The power conversion system 1 includes, for example, a transformer group 2 (FIG. 2), a forward converter group 3, an inverse converter group 5, and a controller 40. The power conversion system 1 steps down three-phase AC power supplied from an AC power supply PS (FIG. 2), forward-converts the stepped-down AC power to produce DC power, inversely converts the DC power to produce three-phase AC power, and supplies the three-phase AC power to an electric motor 8 (FIG. 2).

The power conversion system 1 generates U-phase, V-phase, and W-phase AC power to be supplied to the electric motor 8 using separate transformers of the transformer group 2, forward converters of the forward converter group 3, and inverters of the inverse converter group 5, respectively.

For example, the forward converter group 3 includes forward converters 3U, 3V, and 3W.

The inverse converter group 5 includes a set of inverters 5U and 5X, a set of inverters 5V and 5Y, and a set of inverters 5W and 5Z.

The power conversion system 1 generates U-phase AC power to be supplied to the electric motor 8 using a transformer 20U of the transformer group 2, the forward converter 3U, and the set of the inverters 5U and 5X. Similarly, the power conversion system 1 generates V-phase AC power to be supplied to the electric motor 8 using a transformer 20V of the transformer group 2, the forward converter 3V, and the set of inverters 5V and 5Y. The power conversion system 1 generates W-phase AC power to be supplied to the electric motor 8 using a transformer 20W of the transformer group 2, the forward converter 3W, and the set of the inverters 5W and 5Z.

The transformers 20U, 20V, and 20W may be disposed on the AC input panels 3UI, 3VI, and 3WI shown in FIG. 1, respectively.

For example, an AC input panel 3UI, a forward converter 3U, an inverter 5X, and an inverter 5U are arranged in the stated order in the +X direction. An AC input panel 3VI, a forward converter 3V, an inverter 5Y, and an inverter 5V are arranged in the stated order in the +X direction. An AC input panel 3WI, a forward converter 3W, an inverter 5Z, and an inverter 5W are arranged in the stated order in the +X direction. The controller 40 is arranged in the −X direction with respect to the AC input panel 3UI, and an output panel 5OUT is arranged in the +X direction with respect to the inverter 5W. The output panel 5OUT is connected to load power lines 58U, 58V, and 58W (FIG. 2), and is connected to the electric motor 8 via the load power lines 58U, 58V, and 58W (FIG. 2).

DC bus bars are respectively provided between the AC input panel 3UI and the inverter 5U, between the AC input panel 3VI and the inverter 5V, and between the AC input panel 3WI and the inverter 5W. Neutral lines 65U, 65V, and 65W which will be described later are examples of the DC bus bars. Positive electrode bus bars 60U, 60V, and 60W and negative electrode bus bars 70U, 70V, and 70W which are not shown are also examples of the DC bus bars. In the following description, the neutral line 65U, the positive electrode bus bar 60U, and the negative electrode bus bar 70U may be collectively called a DC bus bar.

FIG. 2 is a configuration diagram of the power conversion system 1 according to the first embodiment.

FIG. 2 shows an AC power supply PS and the electric motor 8 in addition to the power conversion system 1.

For example, the AC power supply PS is a commercial power grid, a generator, or the like and supplies three-phase AC power to the power conversion system 1. The electric motor 8 is, for example, an AC variable speed electric motor such as an induction motor. The electric motor 8 is driven by AC power supplied from the power conversion system 1 and outputs a rotational driving force to an output shaft (not shown).

Next, each part of the power conversion system 1 will be described in order.

The transformer group 2 includes the transformers 20U, 20V, and 20W, for example. Each of the transformers 20U, 20V, and 20W is a three-winding transformer with a different connection system on the secondary side. Since each of the transformers 20U, 20V, and 20W has the same configuration, the transformer 20U will be described below as a representative.

The transformer 20U includes, for example, a primary winding 22U, a secondary winding 24UP, and a tertiary winding 24UN. The transformer 20U receives supply of three-phase AC power from the AC power supply PS at the primary winding 22U, transforms the received three-phase AC power, and outputs three-phase AC power transformed from the secondary winding 24UP and the tertiary winding 24UN. The three-phase AC power output from the secondary winding 24UP and the tertiary winding 24UN is supplied to the forward converter 3U via transformer output lines 25UPRST and 25UNRST. The transformer output lines 25UPRST and 25UNRST are shown in a single line diagram. Each R-phase, S-phase, and T-phase current flows through the transformer output line 25UPRST as a line current. The transformer 20V and the transformer 20W are also configured in the same manner as the transformer 20U. As for the transformer 20V and the transformer 20W, the description of the transformer 20U is incorporated herein by replacing U in the reference numerals of the components with each of V and W.

Since each of the forward converters 3U, 3V, and 3W of the forward converter group 3 has the same configuration, the forward converter 3U will be described below as a representative.

The forward converter 3U includes, for example, a rectifier 32UP and a rectifier 32UN.

Each of the rectifiers 32UP and 32UN includes a three-phase full-bridge diode rectifier circuit. The AC side of the rectifier 32UP is connected to the secondary winding 24UP via the transformer output line 25UPRST. The AC side of the rectifier 32UN is connected to the tertiary winding 24UN via the transformer output line 25UNRST. The load sides of the rectifiers 32UP and 32UN are connected in series with each other. DC power rectified by the rectifiers 32UP and 32UN connected in series with each other is output from a rectifier positive electrode terminal 33UP and a rectifier negative electrode terminal 33UN.

One end of the positive electrode bus bar 60U is connected to the rectifier positive electrode terminal 33UP. A positive electrode input terminal 52U of the inverter 5U and a positive electrode input terminal 52X of the inverter 5X are connected to an extension destination of the positive electrode bus bar 60U. The one end of the positive electrode bus bar 60U does not necessarily have to be a structural end portion of the positive electrode bus bar 60U.

One end of the negative electrode bus bar 70U is connected to the rectifier negative electrode terminal 33UN. A negative electrode input terminal 54U of the inverter 5U and a negative electrode input terminal 54X of the inverter 5X are connected to an extension destination of the negative electrode bus bar 70U. The one end of the negative electrode bus bar 70U does not necessarily have to be a structural end portion of the negative electrode bus bar 70U.

Since the rectifiers 32UP and 32UN are supplied with AC power having different potentials from the secondary winding 24UP and the tertiary winding 24UN of the transformer 20U, each of rectifiers 32UP and 32UN outputs a total value (referred to as a total voltage) of an output voltage of the rectifier 32UP and an output voltage of the rectifier 32UN from the rectifier positive electrode terminal 33UP and rectifier negative electrode terminal 33UN by connecting the respective outputs of the rectifiers 32UP and 32UN in series. The total voltage is smoothed by a capacitor provided in the subsequent stage.

Thus, the forward converter 3U supplies DC power to a capacitor and an inverter (a power converter) provided in the subsequent stage.

Since each of the inverters 5U, 5V, and 5W and the inverters 5X, 5Y, and 5Z of the inverse converter group 5 has the same configuration, in the following, the set of inverters 5U and 5X will be described as a representative.

The set of inverters 5U and 5X is formed to be operable as a full-bridge neutral-point-clamped (NPC) five-level inverter by, for example, a combination of legs including power switching devices such as an insulated gate bipolar transistor (IGBT), a metal-oxide-semiconductor field effect transistor (MOSFET), a gate commutated turn-off thyristor (GCT).

For example, the inverter 5U includes a leg 50U, a capacitor 55UP, and a capacitor 55UN. The inverter 5X includes a leg 50X, a capacitor 55XP, and a capacitor 55XN.

The leg 50U and the leg 50X have the same configuration. The legs 50U and 50X are respectively pulse width modulation (PWM)-controlled to convert the DC power supplied from the forward converter 3U via the positive electrode bus bar 60U and the negative electrode bus bar 70U into three-phase AC power having a variable frequency and a variable voltage.

The capacitor 55UP and the capacitor 55UN are connected in series with each other and are connected to the positive electrode bus bar 60U and the negative electrode bus bar 70U, respectively. The capacitor 55UP and the capacitor 55UN are connected between the positive electrode bus bar 60U and the negative electrode bus bar 70U to smooth the DC power output from the forward converter 3U.

A connection point 65UA between the capacitor 55UP and the capacitor 55UN is connected to the neutral line 65U. The capacitor 55UP and the capacitor 55UN have substantially the same capacitance so that a potential of the connection point 65UA becomes an intermediate potential between the positive electrode bus bar 60U and the negative electrode bus bar 70U.

The capacitor 55XP and the capacitor 55XN are connected in series with each other and are connected to the positive electrode bus bar 60U and the negative electrode bus bar 70U, respectively. The capacitor 55XP and the capacitor 55XN are connected between the positive electrode bus bar 60U and the negative electrode bus bar 70U to smooth the DC power output from the forward converter 3U.

A connection point 65XA between the capacitor 55XP and the capacitor 55XN is connected to the neutral line 65U. The capacitor 55XP and the capacitor 55XN have substantially the same capacitance so that a potential of the connection point 65XA becomes an intermediate potential between the positive electrode bus bar 60U and the negative electrode bus bar 70U.

As described above, the set of capacitors 55UP and 55UN and the set of capacitors 55XP and 55XN smooth a pulsating current output from the rectifiers 32UP and 32UN of the forward converter 3U. The smoothed DC power is supplied to the inverters 5U and 5X.

The inverter 5U supplies U-phase AC power converted by the leg 50U to the electric motor 8 via the load power line 58U. The output of the inverter 5X is connected to the neutral point N on the AC side. The inverter 5X shifts a DC level of the U-phase with a potential of the neutral point N as a reference using X-phase AC power converted by the leg 50X.

The forward converters 3V and 3W are configured similarly to the forward converter 3U. As for the forward converters 3V and 3W, the description of the forward converter 3U is incorporated herein by replacing U in the reference numerals of the components with each of V and W.

A set of inverters 5V and 5Y and a set of inverters 5W and 5Z are configured similarly to the set of inverters 5U and 5X. For the set of inverters 5V and 5Y and the set of inverters 5W and 5Z, the description of the pair of inverters 5U and 5X is incorporated herein by replacing U and X in the reference numerals of the components with V and Y, and W and Z, respectively.

Further, in the following description, the capacitors 55UP, 55UN, 55VP, 55VN, 55WP, and 55WN will be referred to as a capacitor 55 unless otherwise distinguished. In the following description, the legs 50U, 50V, 50W, 50X, 50Y, and 50Z will be referred to as a leg 50 unless otherwise distinguished. The leg 50 is an example of a power conversion unit.

The controller 40 PWM-controls the switching devices by outputting a gate pulse signal to the switching device of the leg 50 due to feedback control based on a detected value of a current detector (not shown) that detects a load current flowing through two or more of the load power lines 58U, 58V, and 58W.

As described above, in the power conversion system 1, the capacitor 55 is provided to suppress fluctuations in the DC voltage due to switching of the leg 50. However, the DC voltage in the inverse converter group 5 may fluctuate according to a magnitude and balance of the current flowing through the electric motor 8.

For example, when the inverter 5U outputs the highest five-level voltage, a current flows through the positive electrode bus bar 60U in a direction from the forward converter 3U toward inverter 5U. At this time, the potential of the positive electrode input terminal 52X of the inverter 5X also becomes a high potential.

Further, when the inverter 5U outputs the lowest five-level voltage at another timing, a current flows through the negative electrode bus bar 70U in a direction from the inverter 5U toward the forward converter 3U. At this time, the potential of the positive electrode input terminal 52X of the inverter 5X becomes a potential close to the potential of the neutral point N.

In this way, the potential of each of the positive electrode bus bar 60U, the negative electrode bus bar 70U, and the neutral line 65U fluctuates with respect to the potential of the neutral point N when the power conversion system 1 is operating.

Figure 3:
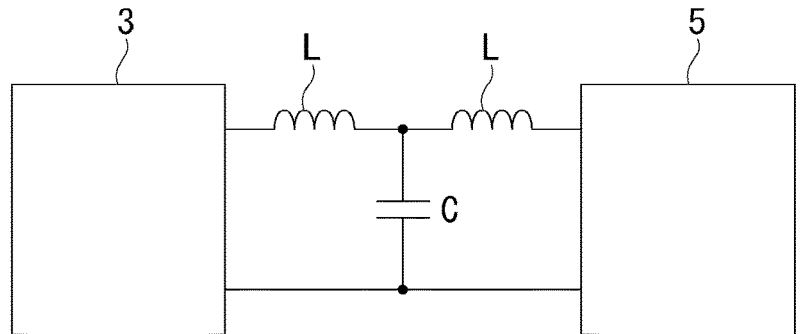
FIG. 3 is a diagram for describing factors that destabilize an operation of a power conversion system of a comparative example.

Incidentally, when the capacity (scale) of the power conversion system increases, this may lead to fluctuations in the potential that exceed an allowable range of the DC bus bar and may become a factor in destabilizing the operation of the power conversion system. FIG. 3 is a diagram for describing factors that destabilize the operation of the power conversion system according to a comparative example.

A configuration in which the forward converter group 3 and the inverse converter group 5 are connected by a DC bus bar of a comparative example and a smoothing capacitor is provided therebetween is shown as a model.

For example, when a size of the power conversion system is increased and thus the DC bus bar is simply extended in an extension direction without changing the cross-sectional area thereof, a wiring inductance L increases according to a respective extension amount. Furthermore, a capacitance of a smoothing capacitor C needs to be increased in proportion to an output capacity of the power conversion system 1 (a capacity of the inverse converter group 5). A closed circuit including the wiring inductance L and the smoothing capacitor C is formed as shown in FIG. 3. A resonance frequency of the closed circuit may decrease as the capacity of the power conversion system increases.

In the case of such a comparative example, when the closed circuit vibrates and resonates due to switching noise when the power conversion system is operated, a current larger than a rated current may be generated in the DC bus bar.

Further, as another comparative example, in order to suppress the occurrence of such resonance, resonance may be suppressed by providing a reactor, which is a lumped constant type circuit element, in the closed circuit, adjusting the inductance of the closed circuit and shifting the resonance frequency of the closed circuit. However, since the size of a reactor that can pass a relatively large current becomes larger, it may be difficult to mount the reactor. In response thereto, there has been a need for a coping method that does not use a lumped constant type circuit element such as a reactor.

Figure 4A:
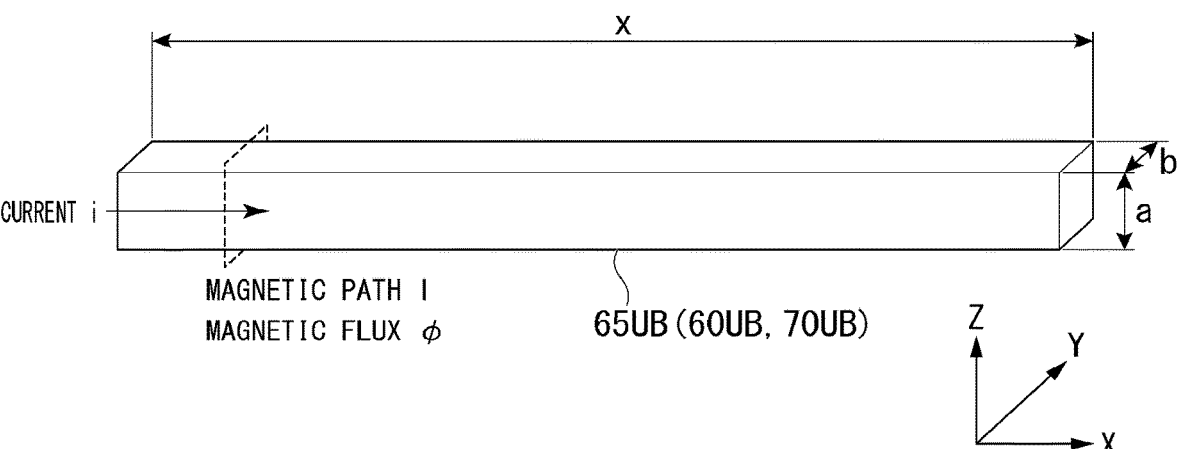
FIG. 4A is a diagram for describing a DC bus bar according to the first embodiment.
Figure 4B:
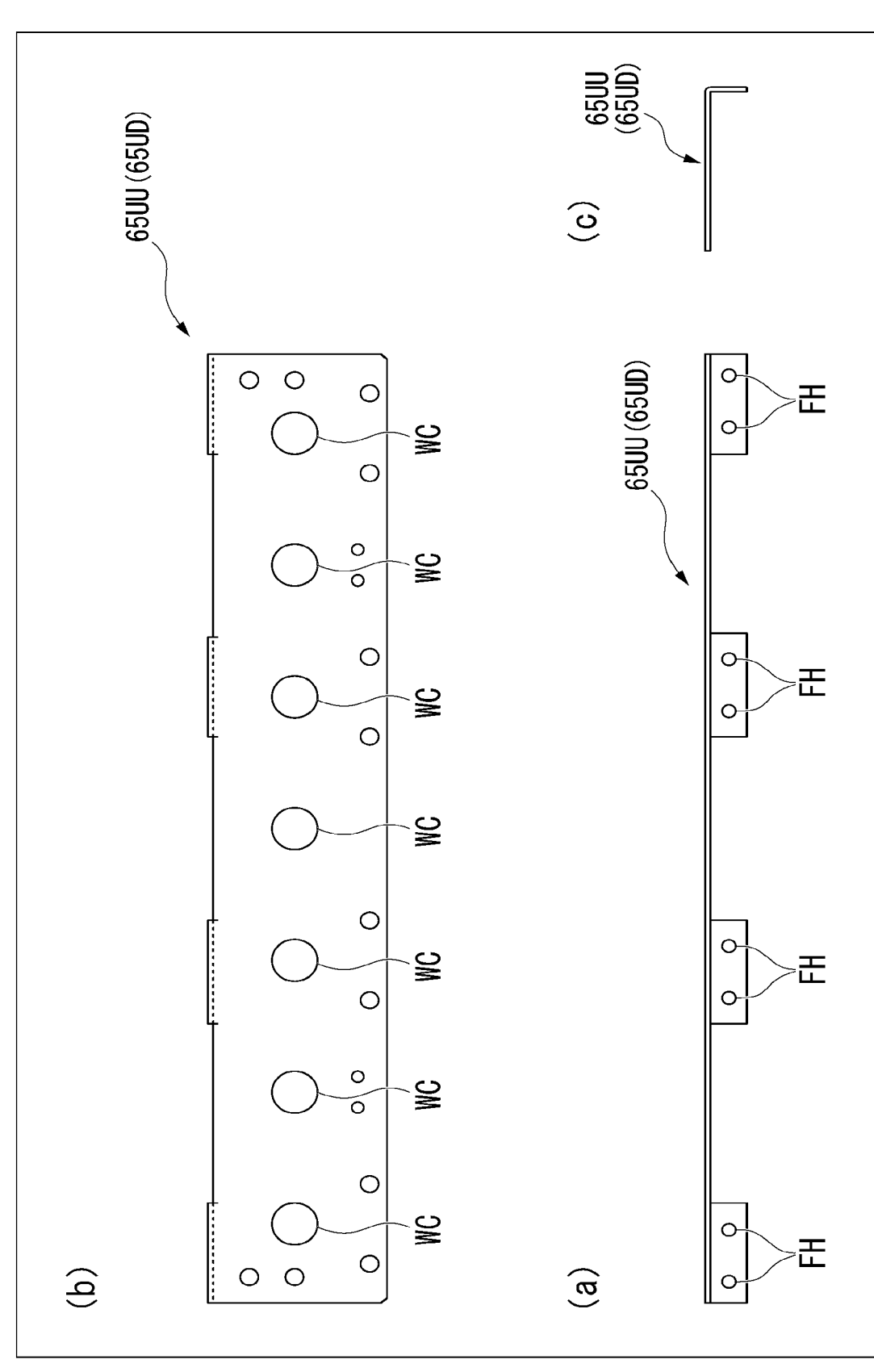
FIG. 4B is a diagram for describing the DC bus bar according to the first embodiment.
Figure 5:
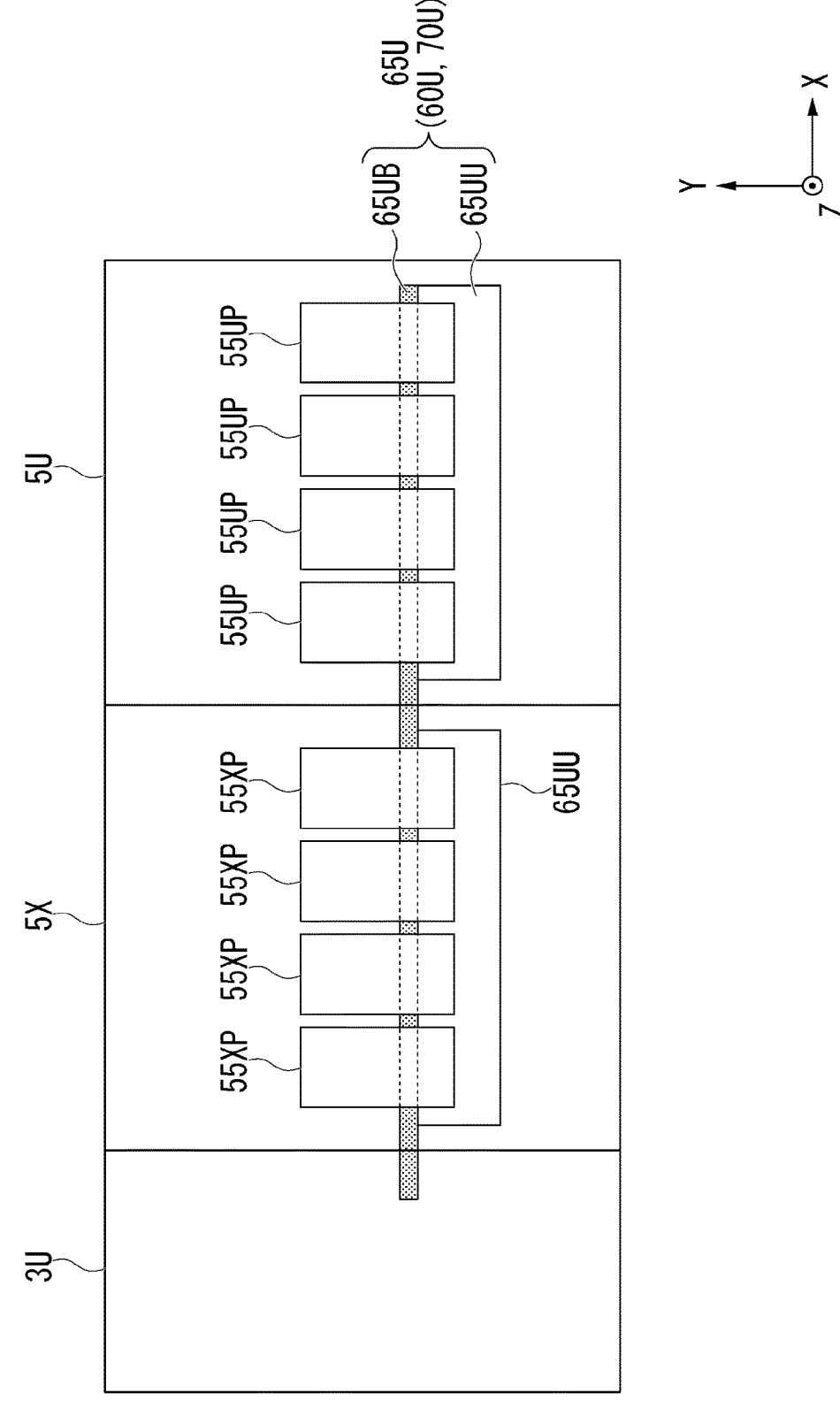
FIG. 5 is a layout diagram of the DC bus bar according to the first embodiment.
Figure 6A:
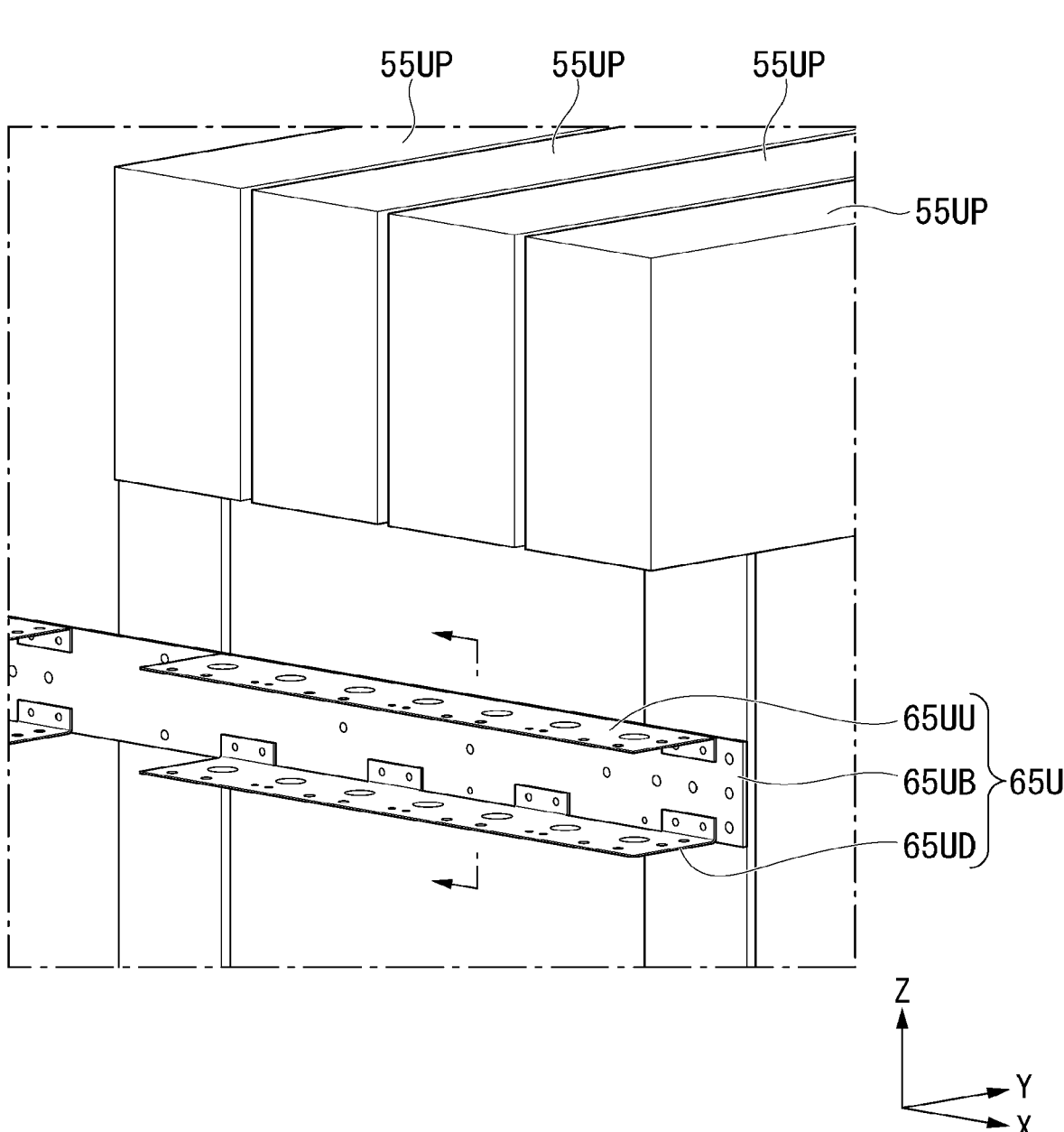
FIG. 6A is an overhead view of a DC bus bar portion according to the first embodiment.
Figure 6B:
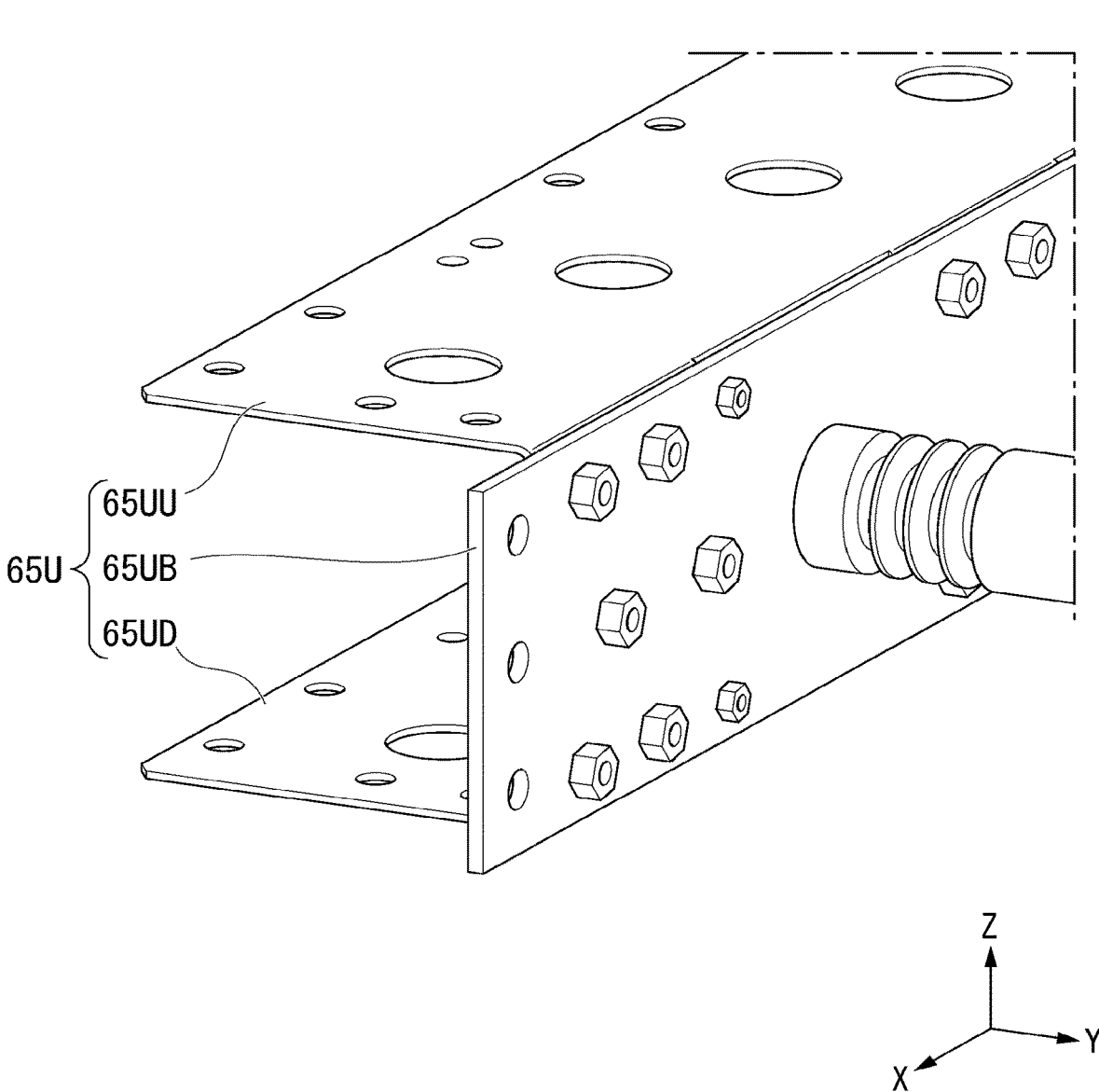
FIG. 6B is an overhead view of the DC bus bar portion according to the first embodiment.
Figure 7:
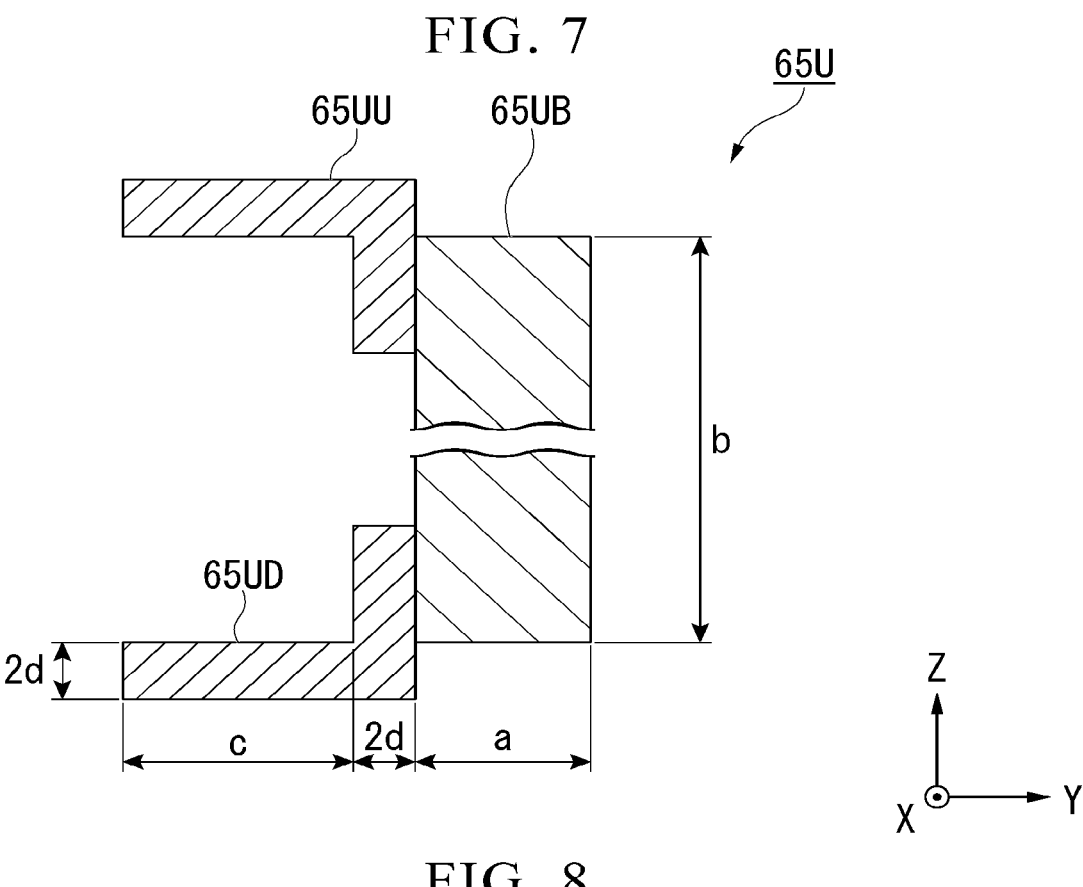
FIG. 7 is a cross-sectional view of the DC bus bar according to the first embodiment.

FIGS. 4A and 4B are diagrams for describing the DC bus bar according to the first embodiment. FIG. 5 is a layout diagram of the DC bus bar according to the first embodiment. FIGS. 6A and 6B are overhead views of the DC bus bar portion according to the first embodiment. FIG. 7 is a cross-sectional view of the DC bus bar according to the first embodiment.

The description of the DC bus bar shown in FIGS. 4A to 7 can be applied to the positive electrode bus bar 60U, the negative electrode bus bar 70U, and the neutral line 65U. The neutral line 65U will be described below as an example of the DC bus bar.

The neutral line 65U includes a first conductor 65UB, a second conductor 65UU, and a third conductor 65UD.

FIG. 4A shows an example of the first conductor 65UB of the neutral line 65U.

(a) in FIG. 4A shows a front view of the first conductor 65UB, (b) in FIG. 4A shows a top view of the first conductor 65UB, and (c) in FIG. 4A shows a side view of the first conductor 65UB.

The first conductor 65UB is made of, for example, a plate-shaped metal having a length x, a width a, and a thickness b. The first conductor 65UB extends in the X direction and is disposed so that a normal to a surface thereof is directed in the Y direction. A width direction of the surface is the Z direction. The first conductor 65UB is supported by a frame (not shown) of a housing via a plurality of insulators (FIG. 6B) disposed at predetermined positions, and is fixed in a state in which the first conductor 65UB is insulated from the frame of the housing by each of the insulators. The length x of the first conductor 65UB is longer than a width of the housing of each device related to the power conversion system. For example, the width a is sufficiently long with respect to the thickness b.

For example, in the surface of the first conductor 65UB normal to the Y direction, a plurality of through holes (not shown) are provided at predetermined positions in the extension direction (the X direction). For example, a nut (FIG. 6B) having a predetermined thread diameter may be press-fitted into each of the through holes. The plurality of through holes are used to respectively fix the second conductor 65UU and the third conductor 65UD.

FIG. 4B shows an example of the second conductor 65UU of the neutral line 65U.

The second conductor 65UU is formed to have a plate shape, extends in the X direction, and is disposed so that a normal to a surface is directed in the Z direction. A width direction of the surface is the Y direction. A flange for fixing to the first conductor 65UB is provided at an end portion of the second conductor 65UU in the +Y direction. The flange may be provided over the entire length of the second conductor 65UU in the extension direction, and may be formed to have a predetermined length (a bending width) shorter than the total length in the extension direction and may be disposed at a plurality of locations within the total length in the extension direction. The flange shown in FIG. 4B is an example of the latter. A plurality of through holes FH are formed in the flange at predetermined intervals in the extension direction. The plurality of through holes FH are used to fix the second conductor 65UU to the first conductor 65UB. A plurality of through holes WC for ventilation may be provided in the surface of the second conductor 65UU.

The third conductor 65UD may be formed to have the same shape as the second conductor 65UU.

The layout diagram of FIG. 5 is a plan view showing schematic positions of the DC bus bars in each of the housings of the power conversion system 1. A plurality of rectangular frames in FIG. 5 indicate housings of each device of the forward converter 3U, the inverter 5X, and the inverter 5U. As shown in the layout diagram of FIG. 5, the neutral line 65U is disposed over each of the housings of the forward converter 3U, the inverter 5X, and the inverter 5U.

The overhead view of FIG. 6A is a view of the inside of the housing of the inverter 5U from a position closer to the front. The overhead view of FIG. 6B is a view of the inside of the housing of the inverter 5U from a position closer to the rear. As shown in FIG. 6A, the neutral line 65U is disposed at a position lower than the capacitor 55UP. The neutral line 65U is mounted within a limited range in a height direction without protruding beyond the width of the first conductor 65UB. As shown in FIGS. 6A and 6B, the neutral line 65U can be mounted from the front side of the housing of the inverter 5U. For example, the first conductor 65UB is fastened to a nut (not shown) of the frame by a bolt from the front side. The second conductor 65UU and the third conductor 65UD are fastened to a nut of the first conductor 65UB with a bolt from the front side.

The cross-sectional view of FIG. 7 shows the mutual positional relationship when the first conductor 65UB, the second conductor 65UU, and the third conductor 65UD of the neutral line 65U are combined. The same applies to any one of a positive electrode, a negative electrode, and a neutral point-electrode of direct current. An arbitrary two of the positive electrode, the negative electrode, and the neutral point-electrode of the direct current are an example of a first electrode and a second electrode of direct current.

The first conductor 65UB is applied to a bus bar of a pole that becomes a U-phase DC reference potential (a midpoint potential of direct current).

The first conductor 65UB includes a first flat plate portion having a width a and a thickness b (a first thickness) in a cross section perpendicular to the X direction (the extension direction).

The second conductor 65UU and the third conductor 65UD are connected in parallel to the first conductor 65UB so as to be electrically equipotential to the first conductor 65UB. The cross sections of the second conductor 65UU and the third conductor 65UD are bent in an L shape. The second conductor 65UU and the third conductor 65UD extend in a direction away from the first conductor 65UB (for example, the −y direction). The extension direction of the second conductors 65UU and the third conductors 65UD may be the Z direction when there is no reduction in mounting.

The DC bus bar according to the first embodiment will be described with reference to FIGS. 8 to 9D.

Figure 8:
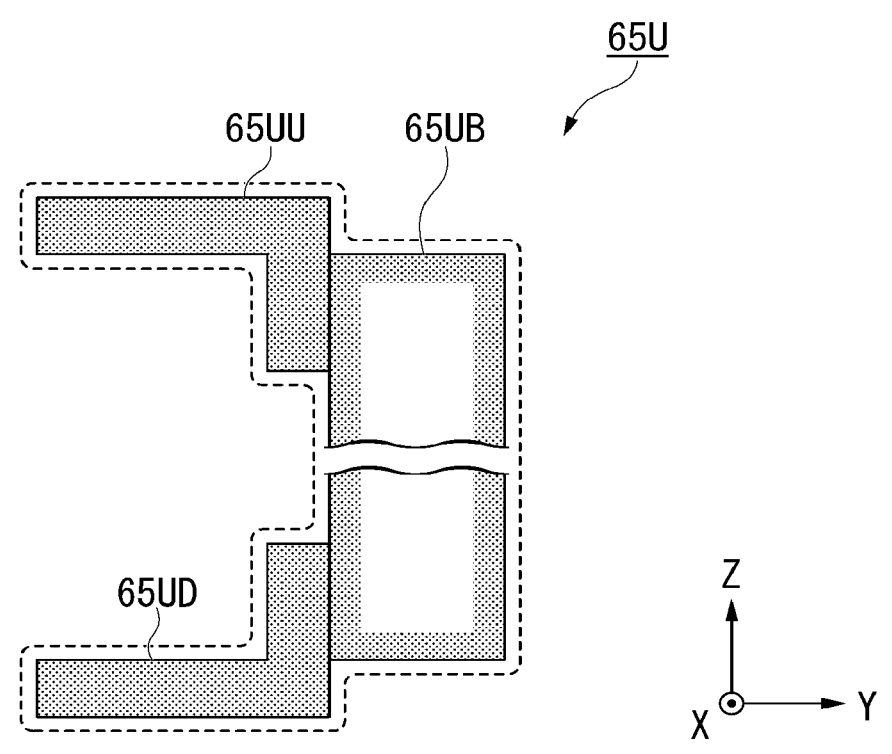
FIG. 8 is a diagram for describing distribution of a current flowing through the DC bus bar and a generated magnetic flux φ according to the first embodiment.

FIG. 8 is a diagram for describing the distribution of the current flowing through the DC bus bar and the generated magnetic flux φ according to the first embodiment.

Due to a surface effect of a conductor (a metal), a component having a high frequency flows near the surface of the conductor, and a component having a low frequency and a DC component flow with a uniform current density over the entire cross section of the conductor. Therefore, since only the DC component flows in a portion relatively deep from the surface of the metal, the conductor may not be effectively used.

In the present embodiment, the component having the lower frequency and the DC component are caused to flow through the first conductor 65UB, the second conductor 65UU, and the third conductor 65UD, and the component having the higher frequency is caused to flow near the surfaces of the second conductor 65UU, the third conductor 65UD, and the first conductor 65UB. A range in which the component having the higher frequency flows is indicated by hatching in the cross-sectional view of FIG. 8. In this case, a magnetic flux generated in the neutral line 65U due to a current i flowing in the extension direction of the neutral line 65U forms a magnetic path along the outer periphery of the cross section of each of the first conductor 65UB, the second conductor 65UU, and the third conductor 65UD. This is indicated by a dashed line.

In this way, the second conductor 65UU and the third conductor 65UD are provided on the first conductor 65UB. Thus, it is clear that the magnetic path formed in the first conductor 65UB is longer than the comparative example formed only by the first conductor 65UB. In the present embodiment, the second conductor 65UU and the third conductor 65UD are used to increase the length of the magnetic path.

Figure 9A:
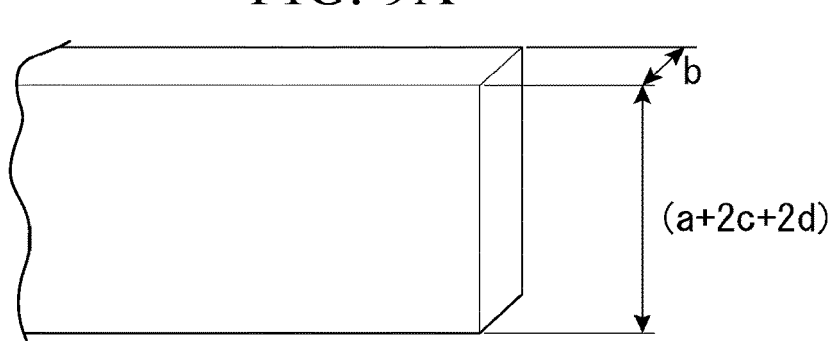
FIG. 9A is a diagram for describing a DC bus bar in a comparative example.
Figure 9B:
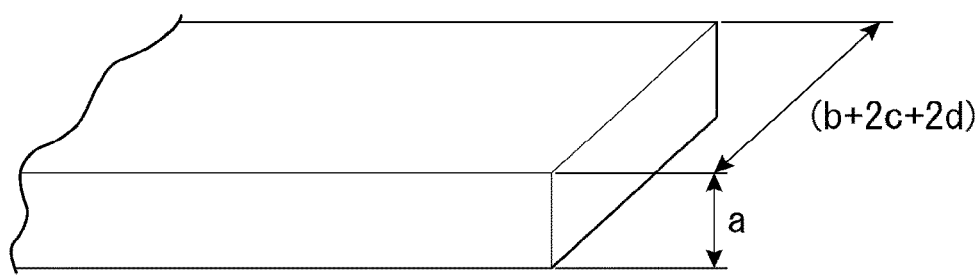
FIG. 9B is a diagram for describing the DC bus bar in the comparative example.
Figure 9C:
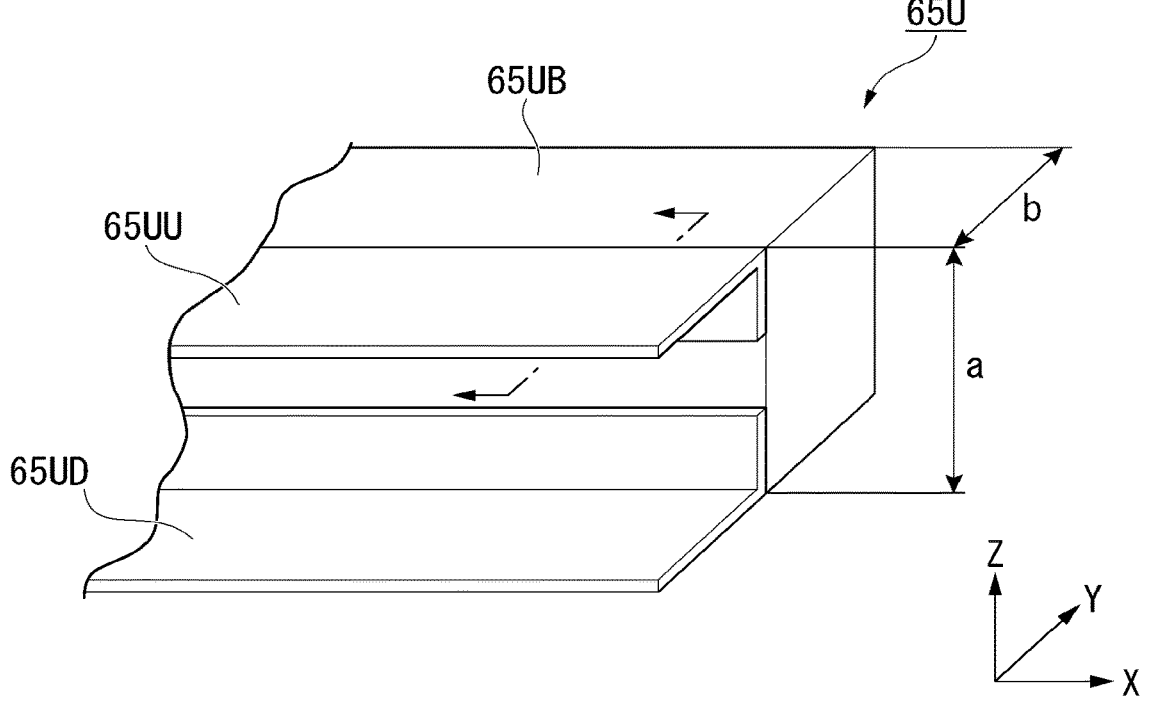
FIG. 9C is a diagram for describing a DC bus bar according to an embodiment.

Hereinafter, the neutral line 65U will be described in more detail with reference to FIGS. 9A to 9D. FIGS. 9A and 9B are diagrams for describing the DC bus bar according to a comparative example. FIGS. 9C and 9D are diagrams for describing the DC bus bar according to the embodiment.

FIG. 9C shows an overhead view of the neutral line 65U.

Figure 9D:
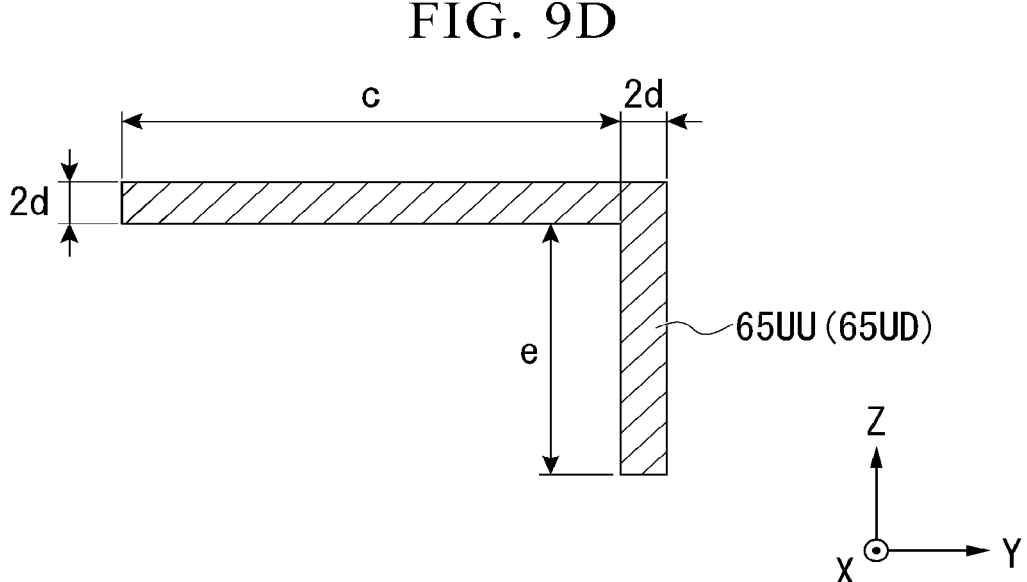
FIG. 9D is a diagram for describing the DC bus bar according to the embodiment.

FIG. 9D shows a cross-sectional view of the second conductor 65UU in a surface perpendicular to the X direction. The second conductor 65UU includes a second flat plate portion which has a cross section bent at a predetermined angle in a cross section perpendicular to the X direction (the extension direction) and is formed to have a thickness 2d (a second thickness) that is thinner than the thickness b (the first thickness). For example, a cross section of the second flat plate portion is bent in an L shape. The predetermined angle is an example of a substantially right angle. A length e of the flange may be determined as appropriate.

The thickness 2d of the second flat plate portion of the second conductor 65UU is at least twice a surface depth δ1 at a reference frequency HFref higher than a carrier frequency for PWM control of the power conversion unit (hereinafter, simply referred to as a carrier frequency). The reference frequency HFref may be determined based on a harmonic frequency in the carrier frequency. For example, the reference frequency HFref may be an integer multiple of the carrier frequency and may be aligned with a harmonic frequency of a particular order.

The thickness 2d of the second flat plate portion of the second conductor 65UU is thinner than a surface depth δ2 of a fundamental frequency of an alternating current generated by the power conversion unit. When the thickness 2d of the second flat plate portion is reduced to such a thickness, the impedance in the fundamental frequency component of the alternating current increases, and thus it is difficult for the alternating current to flow through the second flat plate portion. Further, the reference frequency HFref is associated with frequency components (the carrier frequency and the harmonic frequency thereof) generated by the carrier frequency.

In the above description, the second conductor 65UU is exemplified for description, but the same applies to the third conductor 65UD. For example, the third conductor 65UD includes a third flat plate portion which has a cross section bent at a predetermined angle in a cross section perpendicular to the X direction (the extension direction) and is formed to have a thickness 2d (a third thickness) thinner than the thickness b (the first thickness). For example, a cross section of the third flat plate portion is bent in an L shape.

The thickness (the third thickness) of the third flat plate portion of the third conductor 65UD may be the same as the thickness (the second thickness) of the second flat plate portion of the second conductor 65UU and may vary according to conditions.

As shown in FIG. 9C, a surface of a flange portion on the +Y direction side (on the first end portion side of the second flat plate portion) that is formed on the second flat plate portion of the second conductor 65UU is in contact with a surface of the first conductor 65UB on the −Y direction side. The second flat plate portion (the second end portion) of the second conductor 65UU connected to the flange portion extends in a direction away from the first conductor 65UB (the −Y direction).

The first conductor 65UB, the second conductor 65UU, and the third conductor 65UD are configured to cause the current i to flow in the X direction, which is the extension direction thereof, so that DC power can be supplied across the panels of the power conversion system 1. In addition to the DC component of the current i, the AC component also flows through the DC bus bar. The shape and area of the cross section of the first conductor 65UB and the shape and area of the cross section of each of the second conductor 65UU and the third conductor 65UD may be determined based on a magnitude of the DC component and a magnitude of the AC component of the current i.

For example, the surface of the first conductor 65UB orthogonal to the X direction has a cross section having a width a and a thickness b. An area S of the cross section is the product of the width a and the thickness b. When the current i flows through the first conductor 65UB, a magnetic path is formed along the periphery of the cross section of the first conductor 65UB. Electrical relationships are shown in the following Equations (1) to (4).

$$\text{Magnetic flux } \varphi = \text{Inductance } L \times \text{Current } i \tag{1}$$

$$\text{Magnetic flux } \varphi = \text{magnetic flux density B} \times \text{area } S \tag{2}$$

$$\text{Magnetic field } H = \text{current } i / \text{magnetic path l} \tag{3}$$

$$\text{Magnetic flux density } B = \text{magnetic permeability } \mu \times \text{Magnetic field } H \tag{4}$$

The "magnetic path 1" in Equation (3) is the length of the magnetic path.

The inductance L can be calculated using the following Equation by arranging Equations (1) to (4).

$$\text{Inductance } L = \text{magnetic permeability } \mu \times \text{area } S / \text{magnetic path l} \tag{5}$$

According to Equation (5), when the area S is unchanged, the length of the magnetic path 1 and the inductance L are in an inversely proportional relationship. In other words, when the area S is unchanged, the inductance L can be reduced by increasing the magnetic path 1. Conversely, when the magnetic path 1 is unchanged, the inductance L will also decrease by reducing the area S.

Here, the total amount of conductors in the comparative example of FIGS. 9A and 9B will be examined. The comparative example shown here has a rectangular cross section with a length of perimeter substantially equal to the length of the perimeter of the cross section of the neutral line 65U shown in FIG. 9C. Here, the length of the perimeter of the cross section of the neutral line 65U is regarded as the length of the magnetic path 1.

In the first comparative example shown in FIG. 9A, the first conductor 65UB is widened in the width direction (the Z direction). This conductor includes a flat plate portion having a width (a+2c+2d) and a thickness b (the first thickness) in a cross section perpendicular to the X direction (the extension direction). The area of the cross section is (ab+2bc+2bd).

In the second comparative example shown in FIG. 9B, the first conductor 65UB is widened in the thickness direction (the Y direction). This conductor includes a flat plate portion having a width a and a thickness (b+2c+2d) in a cross section perpendicular to the X direction (the extension direction). The area of the cross section is (ab+2ac+2ad).

In the case that the shape of the cross section of the first conductor 65UB is formed so that the thickness b is sufficiently thinner than the width a (for example, a>>b), when the areas of the first comparative example and the second comparative example are compared with each other, the area of the first comparative example is smaller. The first comparative example is an example in which the total amount of conductors in the DC bus bar can be reduced with respect to the same amount of magnetic path 1.

Therefore, in analyzing the area S of the cross section of the neutral line 65U according to the embodiment, the area of the cross section of the second conductor 65UU is approximated to (2cd) by focusing on the first flat plate portion of the second conductor 65UU. Thus, the area S of the cross section of the neutral line 65U can be approximated to (ab+4cd) including the third conductor 65UD.

Further, according to the above conditions, the thickness 2d of the second conductor 65UU is thinner than the thickness b of the first conductor 65UB (2d<b).

When comparing (ab+4cd) as the area S of the cross section of the neutral line 65U with (ab+2bc+2bd) as the area of the first comparative example, the area S of the cross section of the neutral line 65U is narrower, and thus the neutral line 65U can be configured with a smaller total amount of conductors in the DC bus bar than in the first comparative example (and the second comparative example) for the same amount of magnetic path 1. Along with this, the inductance L of the neutral line 65U also decreases, and thus the neutral line 65U is less likely to resonate than in the first comparative example (and the second comparative example).

According to the above embodiment, the bus bar modules applied to the DC bus bar are disposed over a plurality of housings and distribute DC power to the connected smoothing capacitors and power conversion units. The DC bus bar includes a first conductor applied to either a first electrode or a second electrode of DC, and a second conductor connected in parallel to the first conductor. The first conductor includes a first flat plate portion having a thickness b (the first thickness) in a cross section perpendicular to the extension direction that follows the X direction. The second conductor includes a second flat plate portion which has a cross section bent at a predetermined angle in a cross section perpendicular to the extension direction following the X direction and has a thickness 2d (the second thickness) thinner than the thickness b (the first thickness). Thus, the total amount of conductors in the DC bus bar can be reduced.

The power conversion system 1 may be formed to include a DC bus bar, a first smoothing capacitor disposed in a first housing among a plurality of housings, and a second power converter disposed in a second housing among the plurality of housings.

The power conversion system 1 may include a capacitor 55UP (a first smoothing capacitor) disposed in a housing (a first housing) of the inverter 5U, a leg 50U (a first power conversion unit), a capacitor 55XP (a second smoothing capacitor) disposed in a housing (a second housing) of the inverter 5X, and a leg 50X (a second power conversion unit).

Modified Example of First Embodiment

A modified example of the first embodiment will be described.

The flanges of the second conductor 65UU and the third conductor 65UD in the first embodiment are divided into predetermined lengths (bending widths). On the other hand, the flanges of the second conductor 65UUa and the third conductor 65UDa in the modified example are continuous over the length in the extension direction (the X direction) of the second conductor 65UU. This will be described below.

Figure 10:
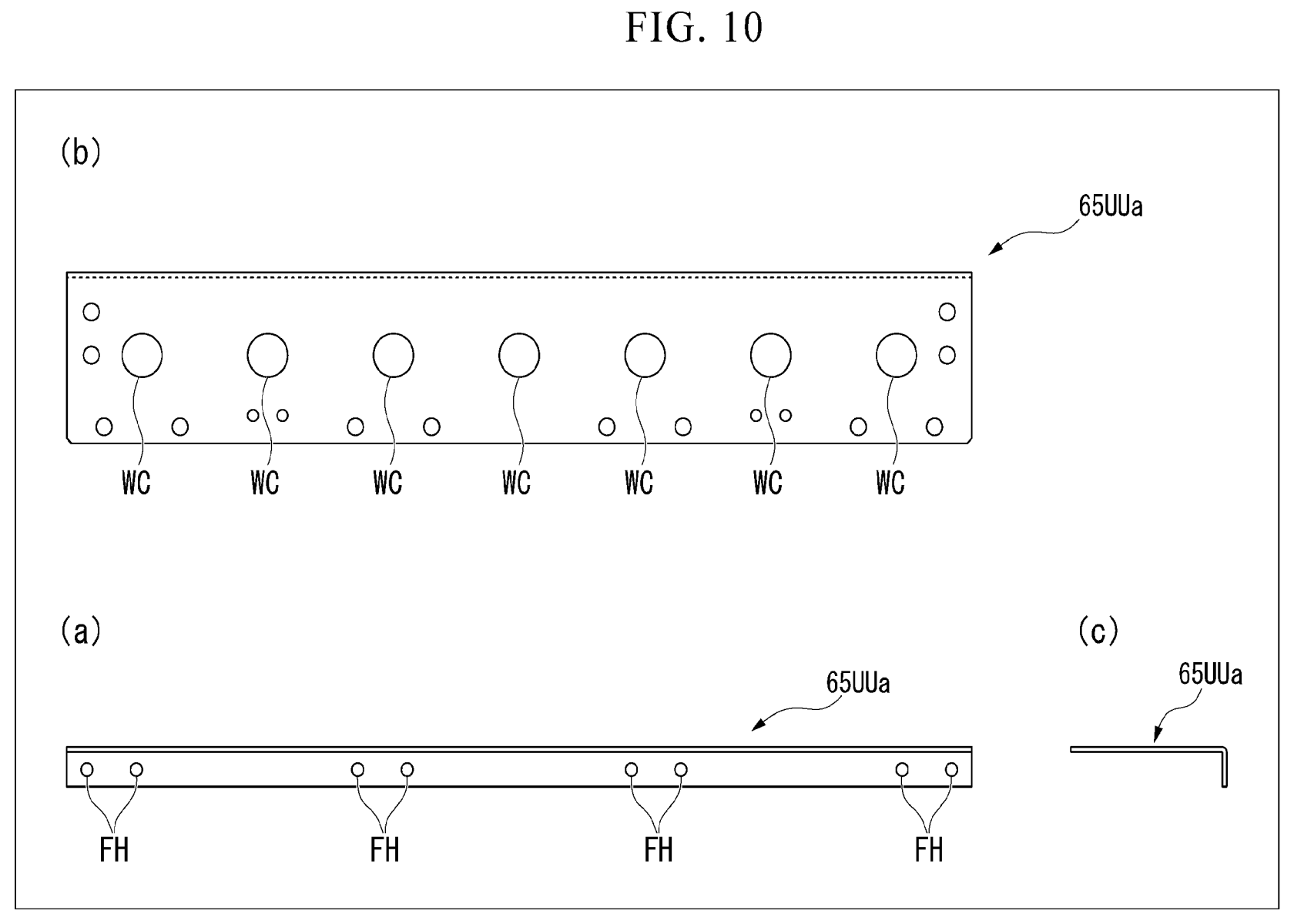
Figure 11:
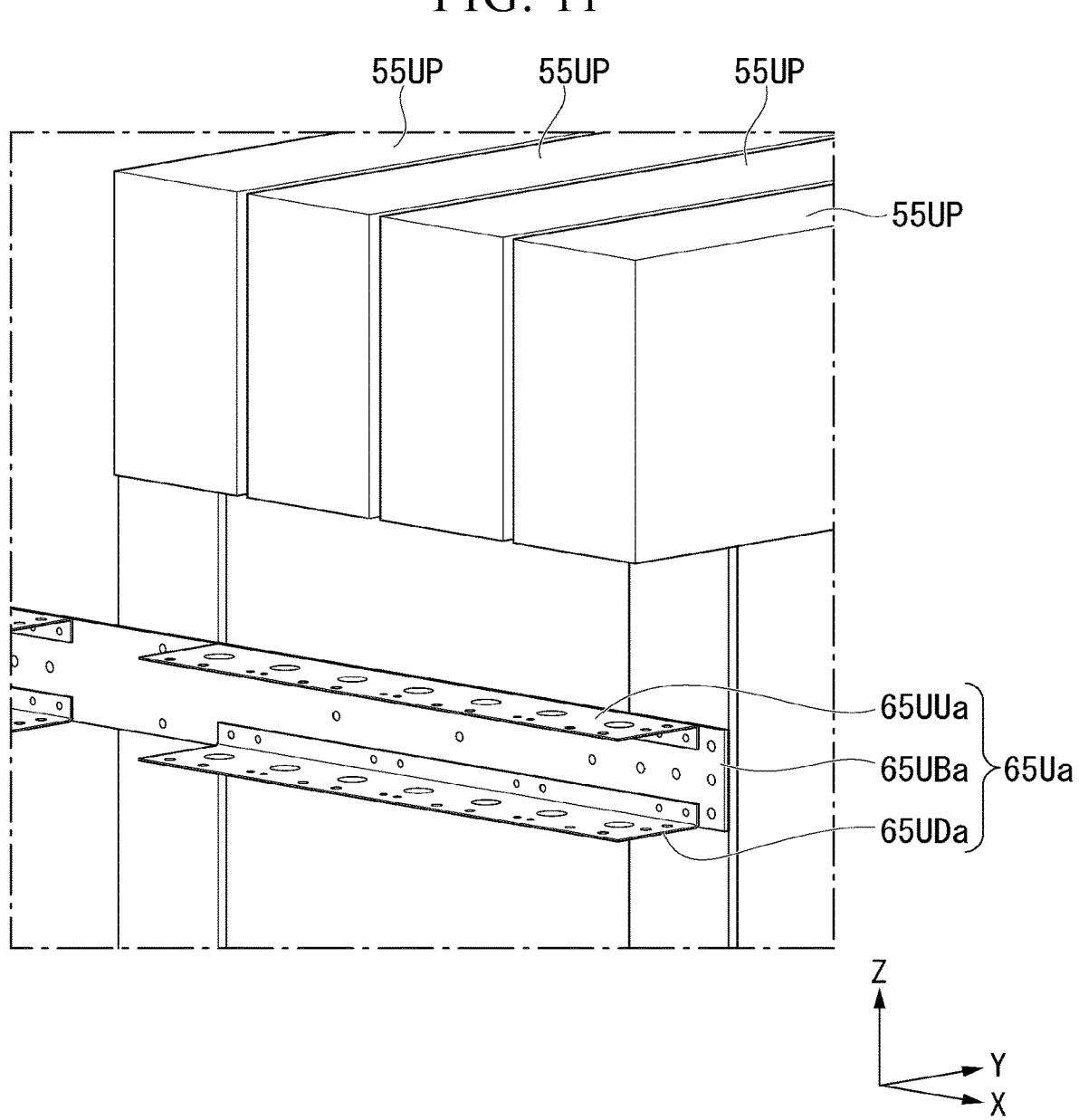
FIG. 11 is an overhead view of a DC bus bar portion according to the modified example of the first embodiment.

FIG. 10 is a diagram for describing a DC bus bar according to a modified example of the first embodiment. FIG. 11 is an overhead view of the DC bus bar portion of the modified example of the first embodiment. FIGS. 10 and 11 replace FIGS. 4B and 6B described above.

The flange of the second conductor 65UUa shown in FIGS. 10 and 11 is continuous over the entire length of the second conductor 65UU in the extension direction (the X direction). When the length of the flange in the extension direction increases in this way, it may be difficult to bend the flange, but since a contact area between the second conductor 65UUa and the first conductor 65UB can be increased, contact resistance between the second conductor 65UUa and the first conductor 65UB can be reduced.

In the case of the modified example of the first embodiment as well, although the amount of conductors in the flange portion is somewhat increased, the total amount of conductors in the DC bus bar can be reduced in the same manner as in the first embodiment.

Second Embodiment

A second embodiment will be described with reference to FIGS. 12 and 13.

The first embodiment has described the structural example which reduces the total amount of the conductor and the inductance in a DC bus bar. In the present embodiment, the DC bus bar is used as a branch circuit. This application will be described.

Figure 12:
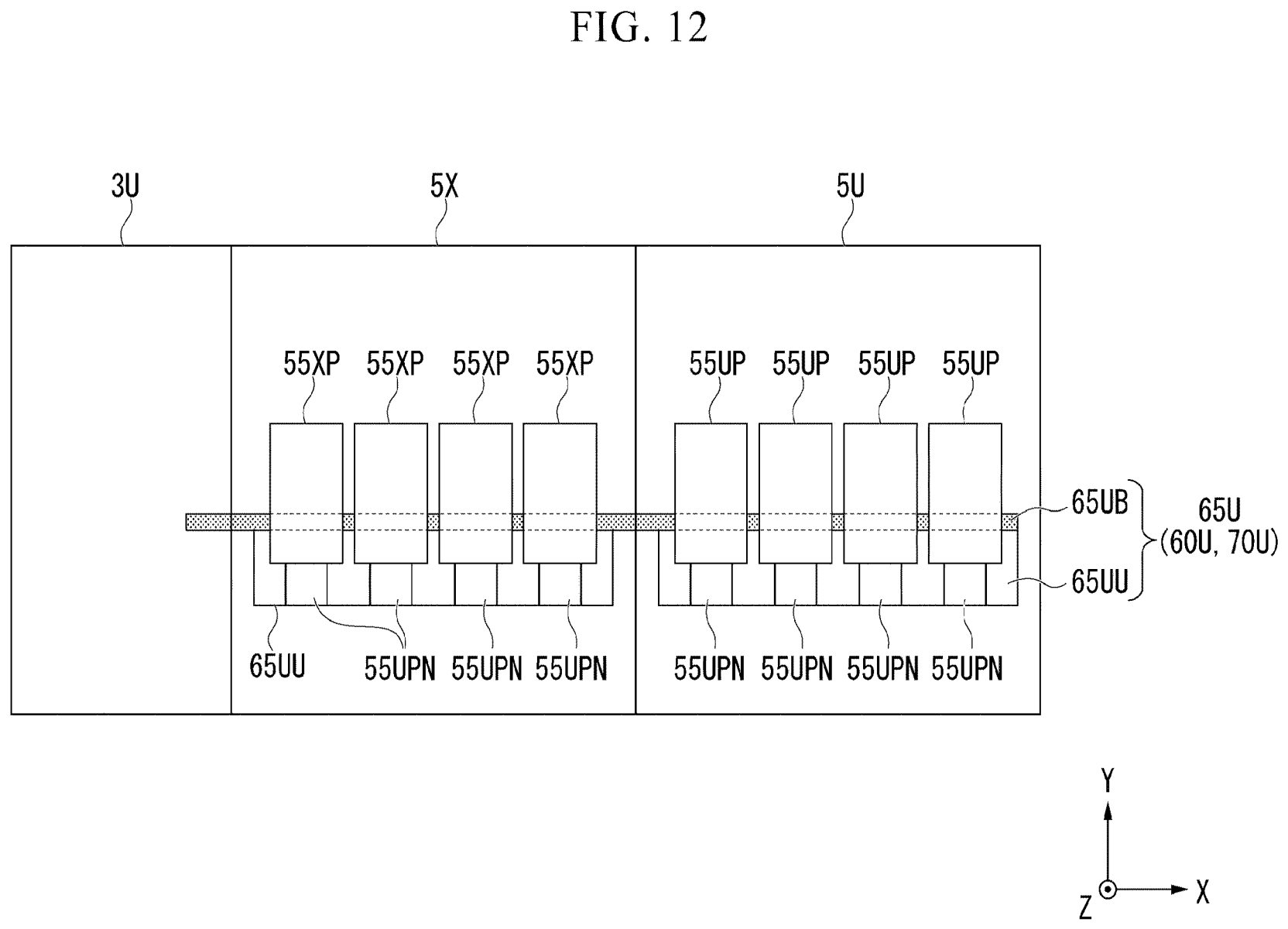

FIG. 12 is a diagram showing a branch circuit from the DC bus bar to the capacitor 55 according to the second embodiment. FIG. 13 is an overhead view of a DC bus bar portion of the second embodiment. FIGS. 12 and 13 replace FIGS. 5 and 6A described above.

Figure 13:
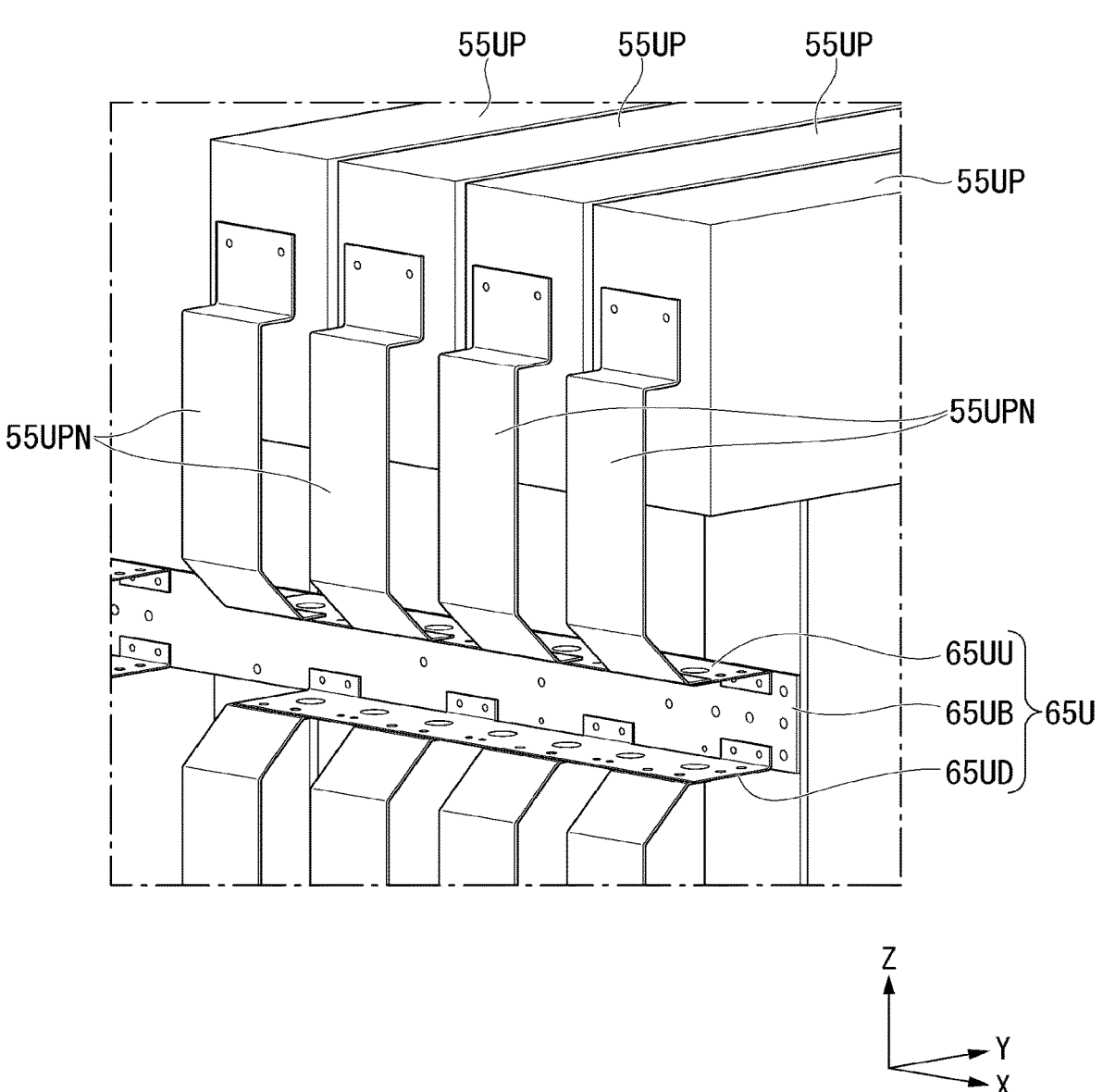
FIG. 13 is an overhead view of a DC bus bar portion of the second embodiment.

As shown in FIGS. 12 and 13, a connection conductor 55UPN is provided between each of the capacitors 55 and the second conductor 65UU. The connection conductor 55UPN connects the electrode of each of the capacitors 55 to the second conductor 65UU. In other words, the electrode of each of the capacitors 55 is connected to the second conductor 65UU via the connection conductor 55UPN. Thus, each of the capacitors 55 is connected to the first conductor 65UB via the connection conductor 55UPN and the second conductor 65UU.

FIGS. 12 and 13 show an example of connection to one electrode of each of the capacitors 55, but the other electrode may also be connected to the DC bus bar in the same manner.

According to the second embodiment, the second conductor 65UU can be used in a part of the branch circuit from the DC bus bar. Thus, the connection conductor 55UPN and the second conductor 65UU are configured to be used together rather than separated, and as in the first embodiment, in addition to reducing the total amount of conductors of the DC bus bar, the total amount of conductors in a range including the connection conductor 55UPN and the second conductor 65UU can be reduced.

According to at least one embodiment described above, the bus bar module distributes DC power to the smoothing capacitors and power conversion units disposed in a plurality of housings. The bus bar module includes a first conductor and a second conductor. The first conductor is applied to either a first electrode or a second electrode of direct current. The second conductor is connected in parallel to the first conductor. The first conductor includes a first flat plate portion having a first thickness in a cross section perpendicular to the extension direction. The second conductor includes a second flat plate portion having a cross section bent at a predetermined angle in a cross section perpendicular to the extension direction and having a second thickness thinner than the first thickness. As a result, the total amount of conductors in the DC bus bar can be reduced.

Although several embodiments of the present invention have been described, the embodiments have been presented by way of example and are not intended to limit the scope of the invention. The embodiments can be implemented in various other forms, and various omissions, replacements, and modifications can be made without departing from the scope of the invention. The embodiments and the modifications thereof are included in the scope and spirit of the invention, as well as the scope of the invention described in the claims and equivalents thereof.

The leg 50 of the inverse converter group 5 may be a full-bridge 3-level inverter instead of the full-bridge NPC type 5-level inverter.

REFERENCE SIGNS LIST 1, 1A Power conversion system
2 Transformer group
20U, 20V, 20W Transformer
3 Forward converter group
3U, 3V, 3W Forward converter
32UP, 32UN, 32VP, 32VN, 32WP, 32WN Rectifier
40 Controller
5 Inverter group
5U, 5V, 5W, 5X, 5Y, 5Z Inverter
55, 55UP, 55UN, 55VP, 55VN, 55WP, 55WN, 55XP, 55XN, 55YP, 55YN, 55ZP, 55ZN Capacitor
65U, 65V, 65W Neutral line (bus bar module)
60U, 60V, 60W Positive electrode bus bar (bus bar module), negative electrode bus bar
70U, 70V, 70W Negative electrode bus bar (bus bar module)
65UB First conductor
65UU Second conductor
65UD Third conductor
8 Electric motor
PS AC power supply

The invention claimed is:

1. A bus bar module disposed over a plurality of housings to distribute DC power to smoothing capacitors and power conversion units, comprising:
   a first conductor applied to either a first electrode or a second electrode of direct current; and
   a second conductor connected in parallel to the first conductor,
   wherein the first conductor includes a first flat plate portion formed to have a first thickness in a cross section perpendicular to an extension direction,
   the second conductor includes a second flat plate portion having a cross section bent at a predetermined angle in a cross section perpendicular to the extension direction and formed with a second thickness thinner than the first thickness, and
   a thickness of the second conductor is twice or more a surface depth of a reference frequency higher in frequency than a carrier frequency of PWM control in the power conversion unit.

2. The bus bar module according to claim 1, wherein the thickness of the second conductor is thinner than a surface depth of a fundamental frequency of alternating current generated by the power conversion unit.

3. The bus bar module according to claim 1, wherein the reference frequency is associated with a frequency component generated by the carrier frequency.

4. The bus bar module according to claim 1, wherein the smoothing capacitor is connected to the first conductor through the second conductor.

5. The bus bar module according to claim 1, wherein a through hole that allows ventilation is provided in the second flat plate portion.

6. The bus bar module according to claim 1, wherein:

a flange is formed on a first end side of the second flat plate portion, and a length of the flange in the extension direction is a part or whole of the length of the second conductor in the extension direction.

7. A power conversion system which includes the bus bar module according to claim 1, wherein a smoothing capacitor is disposed in a first housing among the plurality of housings, and a power converter is disposed in a second housing among the plurality of housings.

8. The power conversion system according to claim 7 comprising:

a forward converter that supplies DC power to the smoothing capacitor and the power converter.

9. A power conversion system which includes the bus bar module according to claim 1, wherein a first smoothing capacitor and a first power unit disposed in a first housing;

a second smoothing capacitor and a second power unit disposed in a second housing;

the first smoothing capacitor and the second smoothing capacitor are included in the smoothing capacitors; and the first power unit and the second power unit are included in the power conversion units.

10. A bus bar module disposed over a plurality of housings to distribute DC power to smoothing capacitors and power conversion units, comprising:

a first conductor applied to either a first electrode or a second electrode of direct current; and a second conductor connected in parallel to the first conductor, wherein the first conductor includes a first flat plate portion formed to have a first thickness in a cross section perpendicular to an extension direction, and the second conductor includes a second flat plate portion having a cross section bent at a predetermined angle in a cross section perpendicular to the extension direction and formed with a second thickness thinner than the first thickness;

wherein the cross section of the second flat plate portion is bent in an L shape, a first end side of the second flat plate portion bent to form a flange is in contact with a surface of the first conductor, and a second end portion of the second flat plate portion connected to the first end extends in a direction away from the first conductor.

11. A bus bar module disposed over a plurality of housings to distribute DC power to smoothing capacitors and power conversion units, comprising:

a first conductor applied to either a first electrode or a second electrode of direct current;

a second conductor connected in parallel to the first conductor; and a third conductor connected in parallel to the first conductor, wherein the first conductor includes a first flat plate portion formed to have a first thickness in a cross section perpendicular to an extension direction, the second conductor includes a second flat plate portion having a cross section bent at a predetermined angle in a cross section perpendicular to the extension direction and formed with a second thickness thinner than the first thickness, and the third conductor includes a third flat plate portion having a cross section bent at a predetermined angle in a cross section perpendicular to the extension direction and formed to have a third thickness thinner than the first thickness.

12. The bus bar module according to claim 11, wherein:

a cross section of the third flat plate portion is bent in an L shape, and the second flat plate portion and the third flat plate portion extend in a direction away from the first conductor.

13. The bus bar module according to claim 11, wherein a shape and an area of the cross section of the first conductor, and a shape and an area of the cross section of the second conductor are determined based on a magnitude of the direct current component and a magnitude of the alternating current.

* * * * *